US012497906B2

(12) United States Patent
Marande et al.

(10) Patent No.: US 12,497,906 B2
(45) Date of Patent: Dec. 16, 2025

(54) TANDEM STATOR

(71) Applicant: SAFRAN AERO BOOSTERS, Herstal (BE)

(72) Inventors: Julien Marande, Herstal (BE); Rémy Henri Pierre Princivalle, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/853,894

(22) PCT Filed: Mar. 1, 2023

(86) PCT No.: PCT/EP2023/055079
§ 371 (c)(1),
(2) Date: Oct. 3, 2024

(87) PCT Pub. No.: WO2023/193997
PCT Pub. Date: Oct. 12, 2023

(65) Prior Publication Data
US 2025/0237148 A1 Jul. 24, 2025

(30) Foreign Application Priority Data
Apr. 5, 2022 (BE) .................................. 2022/5260

(51) Int. Cl.
*F01D 9/04* (2006.01)
(52) U.S. Cl.
CPC ............. *F01D 9/047* (2013.01); *F01D 9/041* (2013.01); *F05D 2220/3219* (2013.01); *F05D 2240/121* (2013.01); *F05D 2240/122* (2013.01)

(58) Field of Classification Search
CPC .......... F01D 9/047; F01D 9/041; F04D 21/00; F04D 29/542
See application file for complete search history.

(56) References Cited

U.S. PATENT DOCUMENTS

| | | | | |
|---|---|---|---|---|
| 2,924,375 A | * | 2/1960 | Mckissock | F01D 17/162 415/150 |
| 3,861,822 A | * | 1/1975 | Wanger | F04D 29/563 415/162 |
| 4,080,785 A | * | 3/1978 | Koff | F02K 3/077 60/226.3 |

(Continued)

FOREIGN PATENT DOCUMENTS

| | | |
|---|---|---|
| BE | 1026455 A1 | 1/2020 |
| EP | 3070264 A1 | 9/2016 |

(Continued)

OTHER PUBLICATIONS

International Search Report for PCT/EP2023/055079, dated May 17, 2023, 2 pages (English Translation).

*Primary Examiner* — Brian Christopher Delrue
(74) *Attorney, Agent, or Firm* — RANKIN, HILL & CLARK LLP

(57) ABSTRACT

A stator assembly including an upstream blade and a downstream blade axially overlapping and defining between them a channel. The inlet surface of the channel is greater than or equal to the outlet surface of the channel, preferably with a factor of 2. A turbomachine provided with such an assembly, arranged upstream of a high-pressure compressor.

19 Claims, 7 Drawing Sheets

(56) References Cited

U.S. PATENT DOCUMENTS

| | | | | |
|---|---|---|---|---|
| 4,546,606 A | * | 10/1985 | Bouiller | F01D 17/162 |
| | | | | 60/262 |
| 5,259,187 A | * | 11/1993 | Dunbar | F02K 3/06 |
| | | | | 60/226.3 |
| 5,692,879 A | * | 12/1997 | Charbonnel | F04D 29/563 |
| | | | | 415/162 |
| 5,794,432 A | * | 8/1998 | Dunbar | F04D 27/02 |
| | | | | 60/226.1 |
| 5,993,152 A | * | 11/1999 | Schilling | F01D 17/162 |
| | | | | 415/155 |
| 10,167,872 B2 | * | 1/2019 | Davidson | F04D 29/563 |
| 10,815,802 B2 | * | 10/2020 | Prasad | F01D 9/041 |
| 11,033,992 B2 | | 6/2021 | Macfarlane et al. | |
| 11,168,580 B2 | * | 11/2021 | Avola | F02B 27/06 |
| 2006/0263206 A1 | * | 11/2006 | Bouru | F01D 17/162 |
| | | | | 415/159 |
| 2011/0167792 A1 | * | 7/2011 | Johnson | F01D 17/162 |
| | | | | 60/226.3 |
| 2013/0209259 A1 | | 8/2013 | Gomez et al. | |
| 2014/0075956 A1 | * | 3/2014 | Patsouris | F02C 6/08 |
| | | | | 60/785 |
| 2015/0240643 A1 | | 8/2015 | Guemmer | |
| 2016/0069275 A1 | * | 3/2016 | Lecordix | F02C 9/22 |
| | | | | 415/146 |
| 2016/0146040 A1 | | 5/2016 | Simpson et al. | |
| 2016/0376918 A1 | * | 12/2016 | Swann | F01D 15/10 |
| | | | | 60/772 |

FOREIGN PATENT DOCUMENTS

| | | | | |
|---|---|---|---|---|
| EP | 3412876 A1 | | 12/2018 | |
| EP | 3594503 A1 | * | 1/2020 | F02C 3/06 |

* cited by examiner

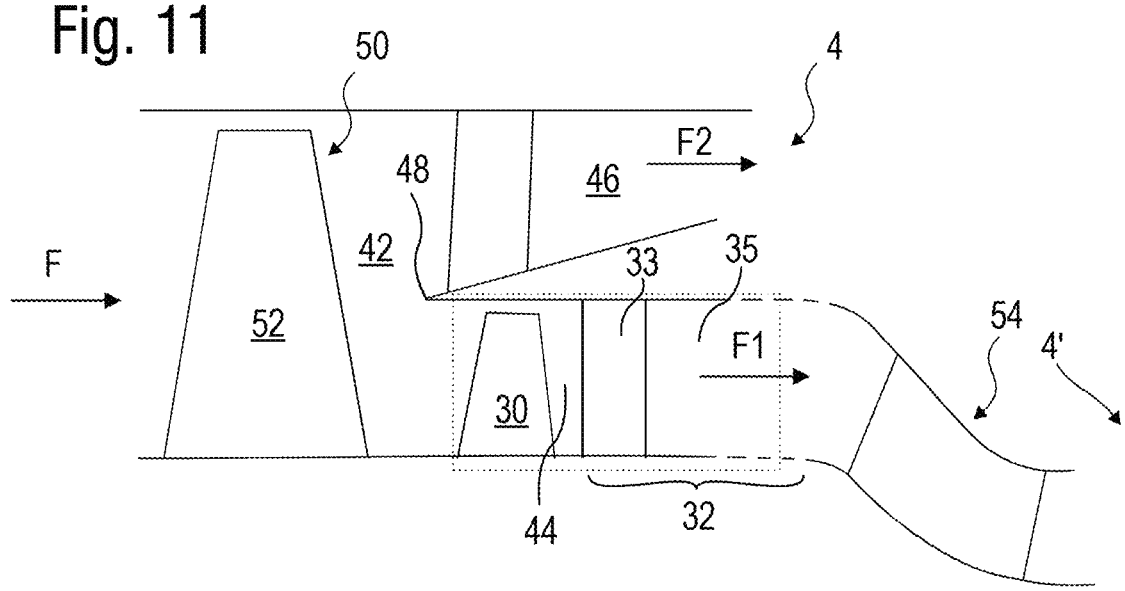
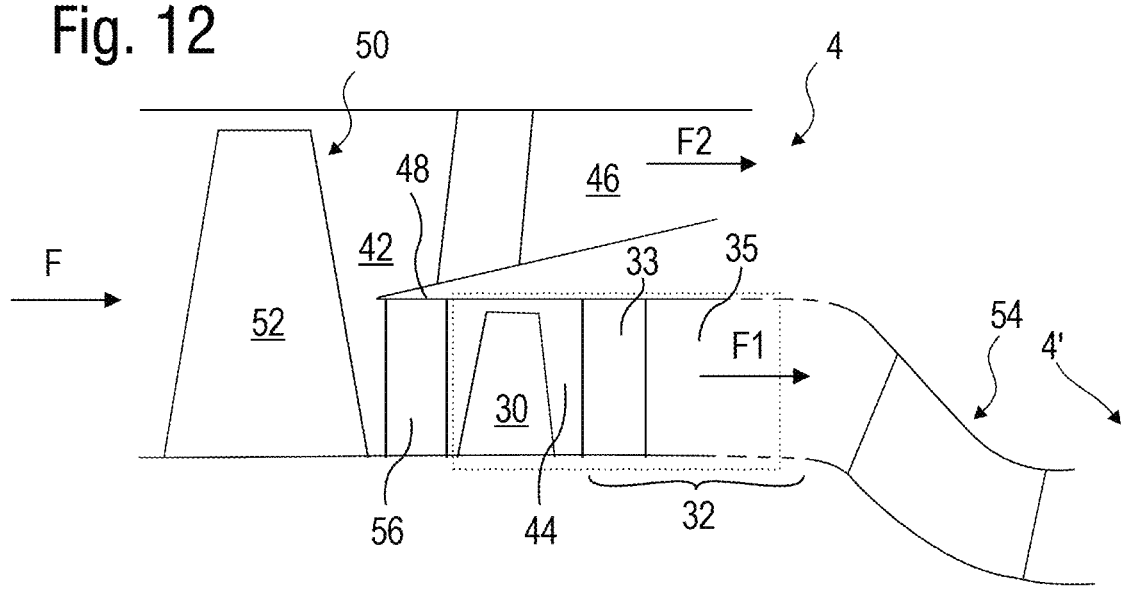

TANDEM STATOR

The invention relates to the design of a stator for a turbomachine and in particular a stator forming the last compression stage of a low-pressure compressor.

PRIOR ART

In order to reduce the size and weight of a turbomachine, it is possible to make the compressors and in particular the low-pressure compressor more compact by reducing the number of compression stages that compose it. However, this requires, in order to obtain an equivalent compression ratio with fewer stages, to drive the rotor in rotation faster.

It is possible to consider speeds close to the speed of sound. The compressor is said to be transonic when at least a radially external part of the rotor moves at a speed greater than that of sound.

Transonic compressors are characterized by a high load on the rotor and stator blades because they must accelerate and straighten an air flow over a shorter axial distance. This load is even higher when the compressor includes variable-orientation blades, which, depending on the engine speed, impose a large deflection on the flow and whose straightening therefore induces an even greater load. In this context, the camber of the blades must be high, but too high a camber presents the risk of reaching flow boundary conditions, conditions in which the air flow separates from the blades (under the effect of the adverse static pressure gradient). In the event of separation of the boundary layer, acceleration and/or straightening of the flow is no longer guaranteed, which is detrimental to the compressor efficiency.

A particularly critical point in this regard is the last rectifier of the compressor, which must imperatively restore a substantially axial flow.

To straighten a flow in a transonic compressor by limiting the aerodynamic load experienced by the blades, it is possible to provide a tandem straightener, i.e. a succession of two rows of stator blades, each of which partially participates in straightening the flow. Such an example is described in document EP 3 412 876 A1. In order to limit the axial size of the compressor, we can imagine a design where the two rows of blades of the tandem partially overlap axially, creating a channel providing a nozzle effect between the blades.

However, flow blockage phenomena and aerodynamic losses can occur when the overlap exceeds 5% of the blade chord length. In the event of blockage, the channel between the blades is no longer supplied with air, the downstream blade no longer straightens the flow and efficiency suffers. To prevent this, it is necessary to adapt the geometry of the blades.

SUMMARY OF THE INVENTION

Technical Problem

The invention aims to solve the drawbacks identified in the state of the art. In particular, the invention aims to propose a stator design which makes it possible to improve the compactness of the turbomachine without harming the efficiency of the turbomachine, and this over the entire operating range—including transonic—of the turbomachine.

Technical Solution

The invention relates to a turbomachine and a method as claimed.

The invention may also relate to a stator assembly for a turbomachine compressor, the assembly comprising: an inner support and an outer support; an upstream blade extending substantially radially from the inner support to the outer support, and comprising a trailing edge and a pressure side; and a downstream blade extending substantially radially from the inner support to the outer support, and comprising a leading edge and a suction side; the assembly being remarkable in that the upstream blade and the downstream blade overlap axially over at least part of their radial height, from the inner support to the outer support, a channel thus being defined between the upstream blade and the downstream blade, the channel being circumferentially delimited by the pressure side of the upstream blade and the suction side of the downstream blade, and radially delimited by the inner support and the outer support; the channel defining: a plurality of curves equidistant from the intrados and the extrados in respective planes parallel to the axial direction and located at a given radial coordinate; a plurality of inlet segments perpendicular to each curve and passing through the point of the leading edge contained in the respective plane; a plurality of outlet segments perpendicular to each curve and passing through the point of the trailing edge contained in the respective plane; an inlet surface, locus of the inlet segments on all the radial coordinates of the blades; an outlet surface, locus of the outlet segments on all the radial coordinates of the blades; the area of the inlet surface being greater than the area of the outlet surface.

Such a convergence of the channel, or in other words, such an opening of the channel at its inlet compared to its outlet, makes it possible to limit the risks of flow blockage and therefore allows a design with a greater axial overlap of the blades. This results in a gain in compactness while guaranteeing a transmission of an adequate quantity of movement to the flow, and therefore without penalizing the efficiency of the compressor.

The invention can also be implemented without inner support, i.e. with the blades cantilevered. The channel is thus delimited by a geometric surface at the free internal end of the blades.

According to an advantageous embodiment of the invention, the area of the inlet surface is between 1.2 and 3 times the area of the outlet surface, and preferably the area of the inlet surface is approximately 2 times the area of the outlet surface.

According to an advantageous embodiment of the invention, in each of the planes, the intrados and the extrados define profiles whose tangents, for a given axial coordinate, respectively define an upstream deflection angle and a downstream deflection angle relative to the axial direction, the downstream deflection angle being greater than or equal to the upstream deflection angle for any given axial coordinate of the overlap, and for any given radial height of the blades. Thus, the channel gradually narrows from upstream to downstream. According to an advantageous embodiment of the invention, for any given axial coordinate and for any given radial height, the downstream deflection angle is greater than the upstream deflection angle by at least 5°, at least 10° or at least 20°. Depending on the expected flow speeds, the narrowing of the channel may be more or less abrupt. According to an advantageous embodiment of the invention, the difference between the downstream deflection angle and the upstream deflection angle decreases as a function of the axial coordinate. Thus, the channel can narrow rapidly at its inlet and then gradually become of constant section towards its outlet.

According to an advantageous embodiment of the invention, the channel contains a multitude of intermediate surfaces, at respective curvilinear positions between the inlet surface and the outlet surface, and the area of the intermediate surfaces decreases monotonically between the inlet surface and the outlet surface.

According to an advantageous embodiment of the invention, the channel contains a multitude of intermediate surfaces at respective curvilinear positions between the inlet surface and the outlet surface, and the area of the intermediate surfaces decreases from the value of the inlet area to a minimum value and then increases to the value of the outlet area.

According to an advantageous embodiment of the invention, the minimum value is equal to or greater than two sevenths of the value of the entry area.

According to an advantageous embodiment of the invention, the minimum value is obtained in the vicinity of a median curvilinear position of the channel.

According to an advantageous embodiment of the invention, the channel has an axial length of between 0.1 and 0.3 times the sum of the axial length of the upstream blade and the axial length of the downstream blade.

According to an advantageous embodiment of the invention, for any radial coordinate, the upstream blade comprises an inlet angle, an outlet angle, and a deviation defined by the difference between the outlet angle and the inlet angle, and the downstream blade comprises an inlet angle, an outlet angle, and a deviation defined by the difference between the outlet angle and the inlet angle, the ratio between the upstream deviation and the sum of the upstream and downstream deviations being between 0.1 and 0.6, and preferably being 0.4. Thus, the downstream blade supports more dynamic load than the upstream blade.

According to an advantageous embodiment of the invention, the ratio between the axial length of the upstream blade and the sum of the axial length of the upstream blade and the downstream blade is between 1 and 4, and is preferably 1.15. This allows a gain in compactness of the entire turbomachine.

According to an advantageous embodiment of the invention, the stator assembly comprises an annular row of upstream blades and an annular row of downstream blades, the number of upstream blades and the number of downstream blades being identical, the blades defining a plurality of identical channels between a respective upstream blade and a respective downstream blade, the inner support being an internal shell and the outer support being an external shroud or a casing.

The invention also relates to a turbomachine in which a stator assembly as mentioned above is arranged in the internal vein, the internal vein optionally describing a swan-neck shape upstream of the stator assembly.

The invention also relates to a method of using the turbomachine according to one of the above embodiments, the method comprising rotating the impeller at a rotational speed such that the relative linear speed of at least a portion of the impeller exceeds the speed of sound.

Advantages of the Invention

The invention is particularly advantageous in that it makes it possible to propose a design that allows up to 30% overlap and therefore as much gain in axial compactness without risking losses of efficiency due to blocking. The mass of the assembly is therefore reduced, reducing consumption and also simplifying assembly or maintenance operations.

DESCRIPTION OF THE DRAWINGS

FIGS. 11 to 13 show examples of stator assembly layout.

DETAILED DESCRIPTION OF EMBODIMENTS

In the following description, the terms "internal" and "external" refer to a positioning relative to the axis of rotation of a turbomachine. The axial direction corresponds to the direction along the axis of rotation of the turbomachine. The radial direction is perpendicular to the axis of rotation. Upstream and downstream refer to the main flow direction of the flow in the turbomachine. While the invention favors axial turbomachines, it is not limited thereto.

The figures are not drawn to scale. In particular, the thicknesses are enlarged to make the figures easier to read.

The term "height" refers to a dimension measured along the direction of the largest dimension of the blades, which may be substantially radial.

The chord is the straight line segment connecting the leading edge to the trailing edge in a plane perpendicular to a radius. The camber designates the median curve connecting the leading edge to the trailing edge at an equal distance from the intrados and the extrados.

Figure 1:
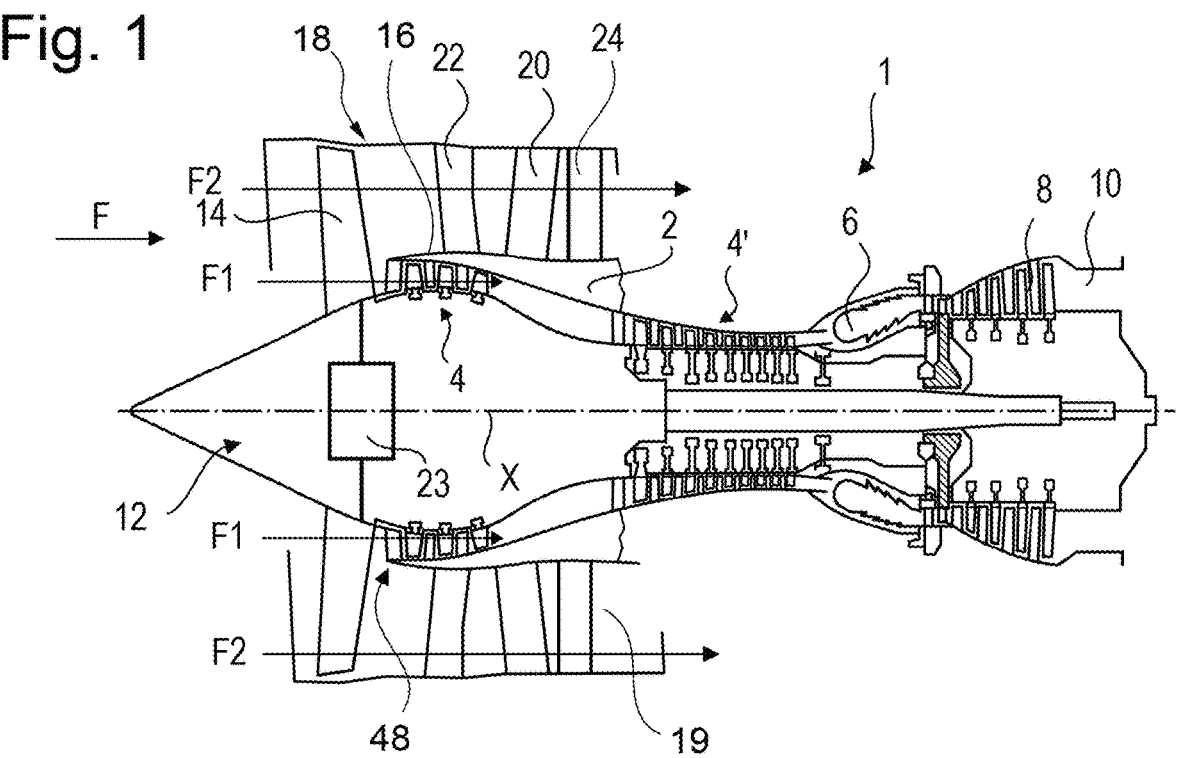
FIG. 1 is a sectional view of a turbomachine.

FIG. 1 shows a schematic cross-sectional view of a turbomachine 1. An inner casing 2 guides a flow F1 which successively passes through compressors 4 (low and high pressure), a combustion chamber 6 and turbines 8 (high and low pressure), before escaping through a nozzle 10. The energy of the combustion drives the turbines 8 in rotation about the axis X. The turbines 8 drive the compressors 4, directly by means of transmission shafts, or indirectly by means of a reducer 23.

The turbines 8 also drive in rotation a rotor 12 with fan blades 14 which set in motion a flow F2.

A fairing 16 and a nacelle 18 delimit a passage 19 which is traversed by the flow F2.

Structural arms 20 take up the forces between the nacelle 18 and the casing 2.

An annular row of stator vanes 22 ("outlet guide vanes", OGV) can be arranged downstream of the rotor 12 to straighten the flow F2.

The reducer 23 can greatly reduce the rotation speed (between the turbines and the fan/propeller).

The turbomachine 1 has a separation nozzle 48 for separating the annular flow F into two annular flows. The invention can be applied downstream of any type of flow separation nozzle and is not limited to the nozzle 48.

Figure 2:
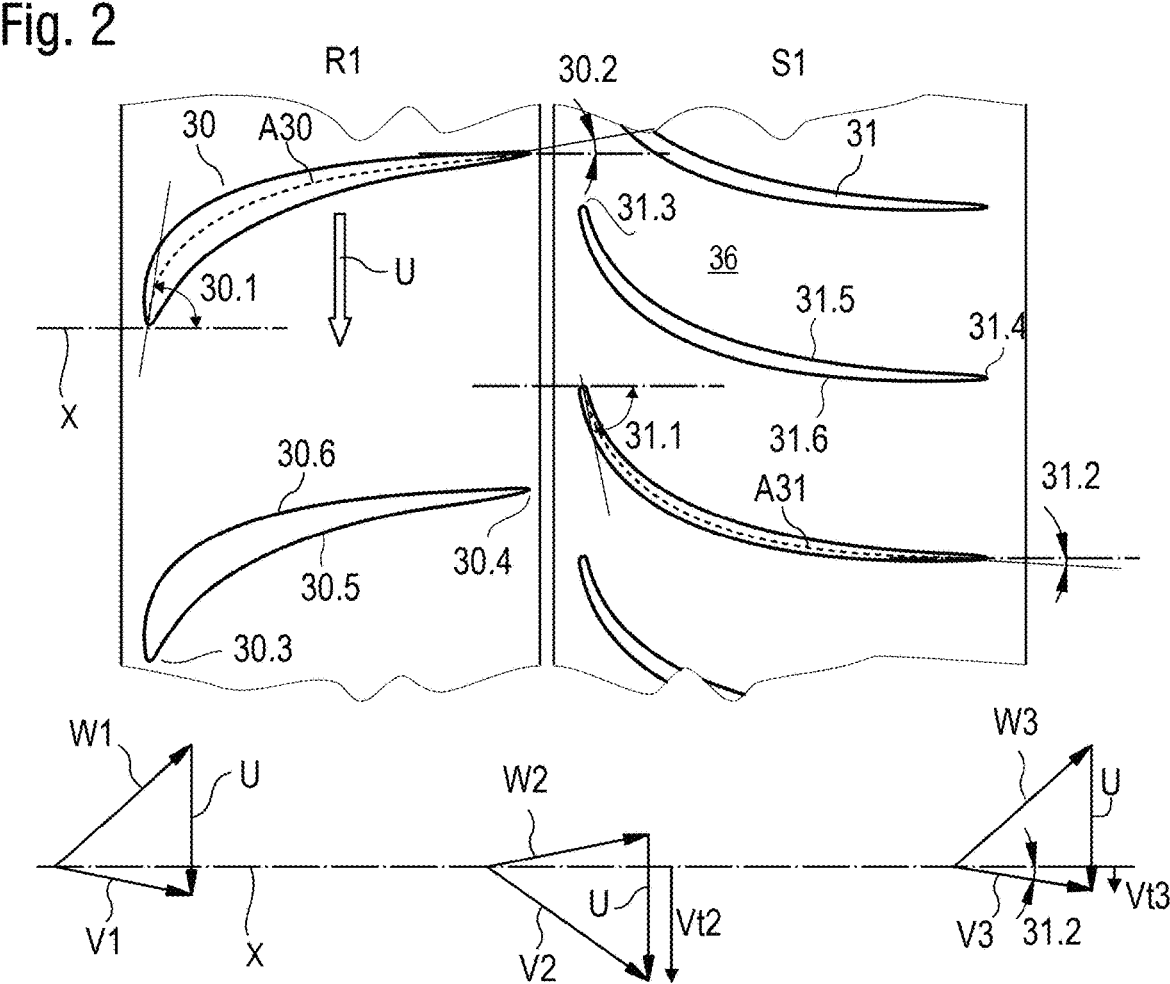
FIG. 2 illustrates a rotor/stator stage with speed diagrams.

The compressors 4 are formed of a succession of compression stages. Each stage comprises rotating blades providing a quantity of movement to the flow and fixed blades straightening the flow direction of the flow. In this respect, FIG. 2 illustrates some parameters helping to define the geometry of a compression stage formed of a rotor R1 and a stator S1, seen in a plane parallel to the axis X and perpendicular to a radius, at a distance r from the axis X. To be exact, FIG. 2 is a representation of a projection developed on a plane (P in FIG. 3) of some adjacent blades. The rotor blades 30 accelerate the flow of the fluid thanks to the energy transmitted by the transmission shaft. The stator stage 31 "transforms" the kinetic energy into pressure thanks to the shape of the stator blades.

The blades 30 rotate at a rotation speed w around the X axis, which means that a point on the blade with radial coordinate r will have a speed U=rw.

The camber of blades 30, 31 is noted A30 and A31 and is shown in broken lines.

The vector diagram to the left of the rotor blades 30 corresponds to the state of the fluid at the inlet of the compression stage. The fluid is presented with an absolute speed V1, according to an orientation which depends on the elements of the turbomachine upstream of the blades 30. The relative speed vector W1 of the fluid entering the rotor is deduced by subtracting the vectors U from V1.

Thus, for the same value of the axial component of the inlet speed, if it is more or less inclined, the relative speed of the air with respect to the rotor is different.

At the outlet of the rotor R1, the fluid has a relative speed W2 whose orientation depends on the geometry of the blades. By adding U to W2, we obtain the absolute outlet speed V2 which is greater in value than V1.

Then, the stator blades 31 deflect and decelerate the fluid, this deceleration being reflected in an increase in pressure. The orientation of the speed V3 depends among other things on the geometry of the stator blades.

The geometry of the blades can be described in part by their inlet angle 30.1, 31.1 and their exit angle 30.2, 31.2.

The "entry angle" of a blade is the angle formed in a plane parallel to the compressor axis and perpendicular to a radius, between the tangent to the camber line and the compressor axis, at the leading edge.

The "exit angle" of a blade is the angle formed in a plane parallel to the compressor axis and perpendicular to a radius, between the tangent to the camber line and the compressor axis, at the trailing edge of the blade.

Thus, the relative speed W2 is substantially oriented according to the exit angle of the rotor blades 30 and the speed V3 is substantially oriented according to the exit angle of the stator blades 31.

Also shown in FIG. 2 are the leading edges 30.3, 31.3, the trailing edges 30.4, 31.4, the intrados 30.5, 31.5 and the extrados 30.6, 31.6 of the blades 30, 31.

The tangential component of the absolute velocity is denoted Vt2 and Vt3.

The Lieblein factor Dli which allows to quantify the aerodynamic load of the blade 31 can be approximated by the formulation:

$$DLi = 1 - \frac{V_3}{V_2} + \frac{Vt_2 - Vt_3}{2SV_2}$$

Where Dli is the Lieblein factor, V2, V3, Vt2 and Vt3 are the absolute velocities and their tangential components as shown in FIG. 2, and S is the angular pitch between two circumferentially adjacent blades.

When DLi is greater than 0.6, it is observed that corner vortices are formed at the interaction between the stator extrados and the inner and outer walls of the vein. In order to limit the load on the stator blades and nevertheless allow a high rotation speed (transonic), the stator S1 of the invention is subdivided into a set of two rows of blades (see FIG. 5).

Figure 3:
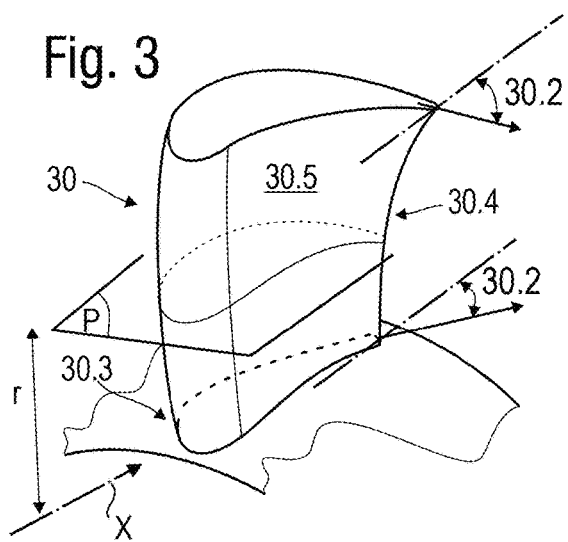
FIGS. 3 and 4 show an isometric view of a rotor blade and a stator blade.
Figure 4:
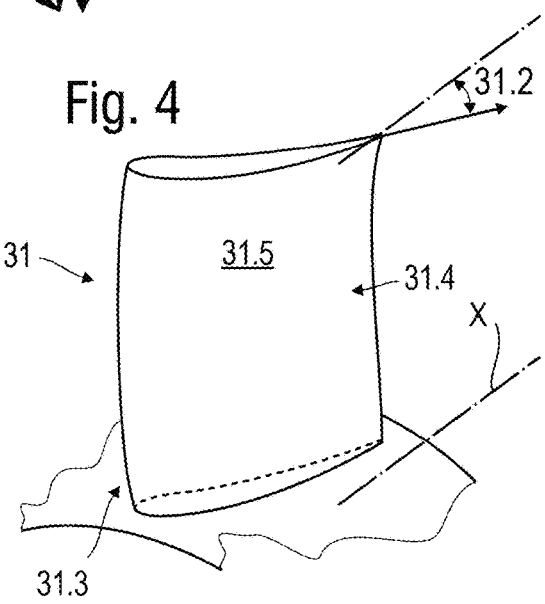

FIGS. 3 and 4 show a rotor blade 30 and a stator blade 31 in perspective, highlighting in particular the fact that the leading edge and the trailing edge as well as the entry and exit angles of the blades vary between their root and their tip.

FIG. 3 also shows the plane P, perpendicular to a radius and a distance r from the X axis.

Figure 5:
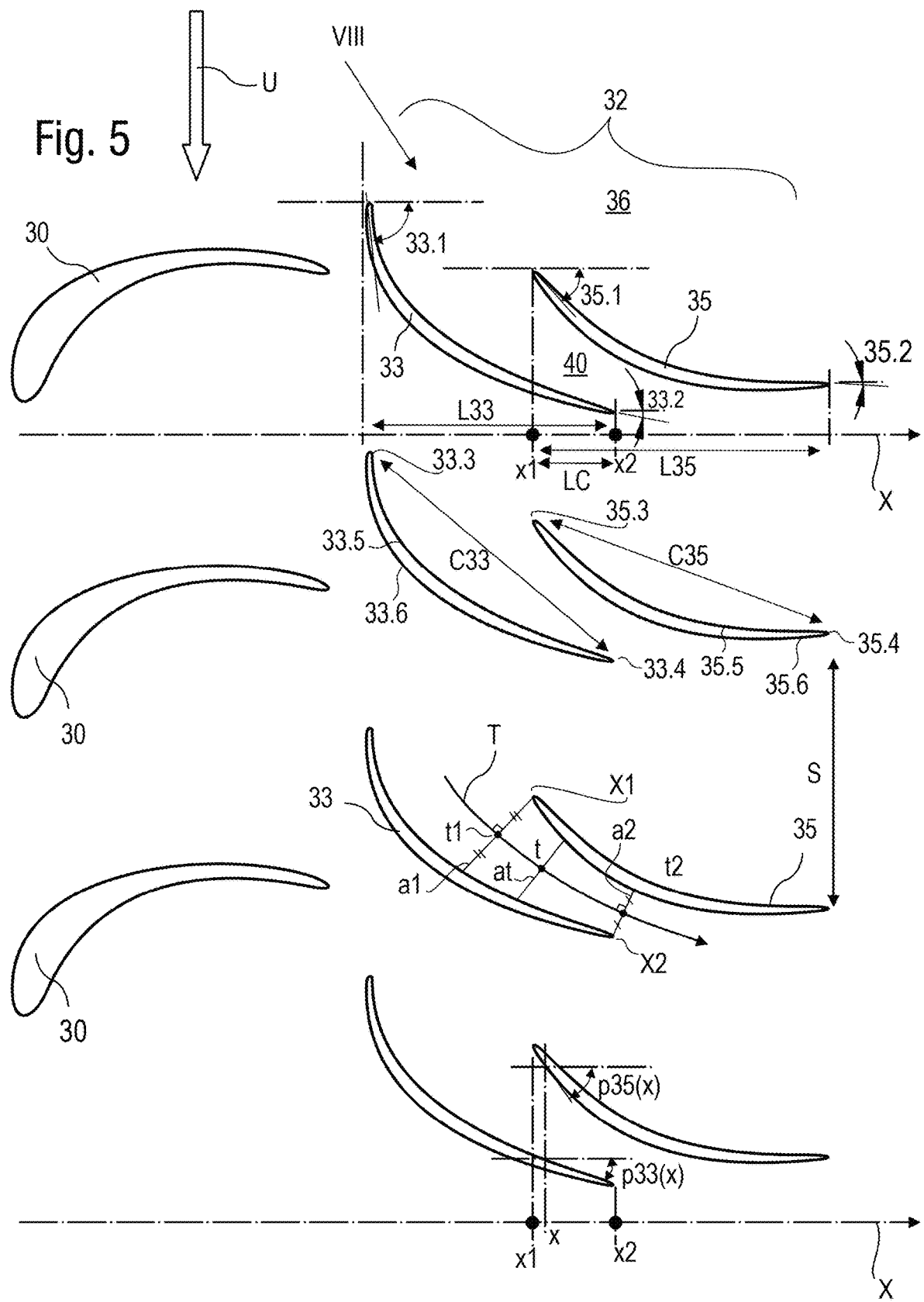
FIG. 5 illustrates a sectional view perpendicular to a radius.

FIG. 5 illustrates a stator assembly 32 according to the invention, preceded by a row of rotor blades 30, seen in the plane P.

Figure 6:
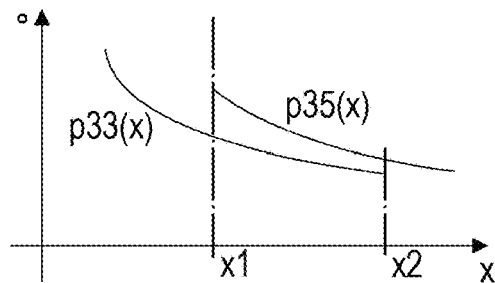
FIG. 6 shows the variations of the angles.

The assembly 32 is composed of an upstream blade 33 and a downstream blade 35, extending from a radially inner support 36 and to a radially outer support 38 (FIG. 6). The inner and outer supports can be platforms for attachment to a supporting structure. The supports can also be shrouds describing 360° around the X axis or angular sectors of shrouds describing a few degrees or a few tens of degrees of angle around the X axis. The blade 33 and the blade 35 are carried by a common inner support and by a common outer support.

In FIG. 5, several pairs of blades 33, 35 are illustrated to facilitate understanding of the different parameters.

In one embodiment, the stator assembly 32 comprises an annular row of blades 33 and an annular row of blades 35. The blades 33, 35 are spaced circumferentially from their neighbors by a pitch S, which may be identical for the two rows of blades.

The blades 33, 35 respectively comprise an inlet angle 33.1, 35.1, an outlet angle 33.1, 35.2, a leading edge 33.3, 35.3, a trailing edge 33.4, 35.4, a lower surface 33.5, 35.5 and a lower surface 33.6, 35.6. The deflection of each blade, which can be denoted 433, 435, is the difference between the outlet angle 33.2, 35.2 and the inlet angle 33.1, 35.1.

The distribution of the aerodynamic load between the two blades 33, 35 can be materialized by a proportion between the upstream deflection Δ33 and the total deflection of the assembly 32, Δ33+Δ35. The ratio Δ33/(Δ33+Δ35) is desired between 0.1 and 0.6. Preferably, this ratio can be approximately 0.4.

In fact, we are trying to limit the load and the deviation on the upstream blade. The upstream profile will typically see 20 to 30° (variation on its radial height) of deviation and the downstream profile will see 30° over its entire radial height.

By limiting the load on the upstream blade 33, it is possible to guarantee a flow supply which is constant on the downstream blade whatever the speed of rotation of the blades 30. Conversely, it is possible to impose a significant load on the downstream blade 35 if the flow on the upstream blade 33 is well controlled.

The downstream blade 35 is arranged circumferentially in the vicinity of the intrados 33.5 of the upstream blade 33. For any axial position, the maximum circumferential distance between the downstream blade 35 and the upstream blade 33 may be less than S/2, or even S/4.

The chord of the blades 33, 35, which connects their leading edges 33.1, 35.1 to their trailing edges 33.2, 35.2 is denoted C33 and C35.

The axial length of the blades is denoted L33 and L35. The position of the blades is such that they overlap at least partially. Thus, an axial overlap length LC is identified in FIG. 5. The length LC can be up to 30% of the sum L33+L35. The length LC is measured from a point X1 of the leading edge 35.3 of the downstream blade 35 and of axial coordinate x1 to a point X2 of the trailing edge 33.4 of the upstream blade 33 and of axial coordinate x2. The overlap is here understood over the entire radial height of the blades but the invention is not limited thereto: a partial overlap is possible, in which case the channel defined above is limited radially by the radial range corresponding to an overlap of the blades.

The axial lengths of the blades 33, 35 may be such that the ratio L33/(L33+L35) is between 1 and 4 and is preferably 1.15.

The axial overlap reveals a channel 40 between the upstream blade and the downstream blade.

In the plane of FIG. 5, a median curve T can be defined, equidistant from the intrados 33.5 and the extrados 35.6. This curve can be such that at each point t of the curve, a tangent to the curve T can be defined, the point t being the midpoint of the segment perpendicular to this tangent, the segment whose ends are on the intrados 33.5 and the extrados 35.6.

Such a segment, called an entry segment, is noted a1 at a point t1 at the entry of the channel 40, and another segment, called an exit segment, is noted a2 at a point t2 at the exit of the channel 40. In other words, at any point X1 of the leading edge 35.3 there corresponds a single segment a1 and at any point X2 of the trailing edge 33.4 there corresponds a single segment a2.

A median (geometric) surface 2 equidistant from the intrados 33.5 and the extrados 35.6 can be defined (see FIG. 8) by the locus of the median curves T for all radial values between the inner support 36 and the outer support 38.

The locus of segments a1 for all values of r forms an input (geometric) surface A1 of channel 40. The locus of segments a2 for all values of r forms an output (geometric) surface A2 of channel 40.

According to the invention, the area $\phi 1$ of the input surface A1 is greater than the area $\phi 2$ of the output surface A2, in particular between 2 and 4 times greater.

This means that seen in the plane of FIG. 5, assuming small variations in the height of the vein (radial distance between the inner and outer supports), the length of segment a1 is at least 2 to 4 times the length of segment a2.

Figure 8:
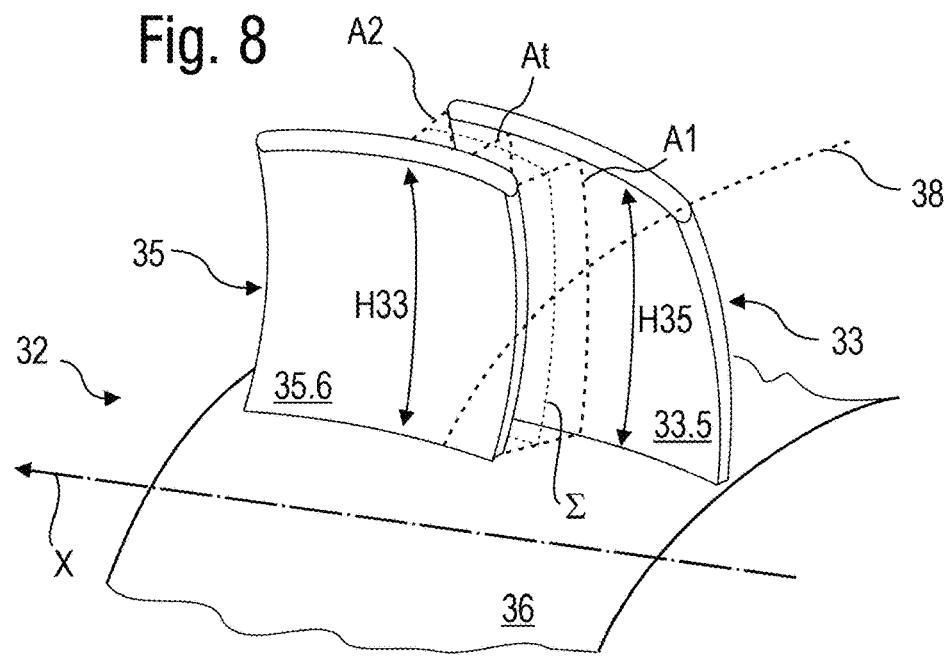
FIG. 8 is an isometric view of the stator assembly.

We can define a relative curvilinear abscissa between t1 and t2, $\mu$, between 0 and 1, and therefore such that t(0)=t1 and t(1)=t2. Since t1 and t2 can have an axial coordinate x that varies according to the radius r considered, using the relative curvilinear abscissa allows us to construct a segment at, at the point t($\mu$), for each value of r. The locus of the segments at by varying r (and keeping $\mu$ constant) allows us to obtain a surface At, which is therefore spaced from the surfaces A1 and A2 in a weighted way: for $\mu$=0.5, the surface At is at "curvilinear equidistance" from the surfaces A1 and A2. FIG. 8 shows the surfaces A1, A2 and At.

FIG. 5 also shows that in any axial coordinate x, a tangent to the intrados 33.5 defines an angle p33(x) and a tangent to the extrados 35.6 defines an angle p35(x). In the example of FIG. 5, for any x in the overlap (in the interval [x1;x2]), the angle p35 is greater than the angle p33. The difference between the angles can vary and be at least 5, at least 10 or at least 20°.

FIG. 6 illustrates the possible variations of the angles p33 and p35 as a function of x. The variation of the difference is monotonic, that is, the function derived from the difference p35−p33 does not change sign.

Figure 7:
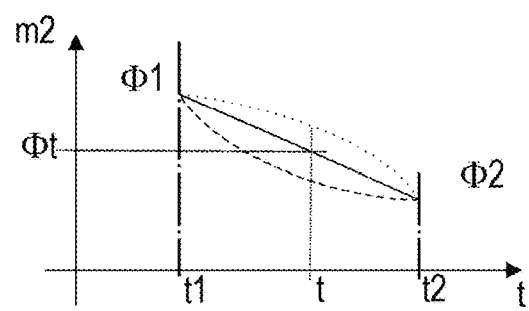
FIG. 7 shows the variations in areas.

FIG. 7 shows three examples of monotonic variations of the surface area between the input surface and the output surface. The variation can be, for example, concave, convex or linear. A slower decreasing trend will limit aerodynamic friction losses, but will form a less stable flow than a rapidly decreasing trend in the channel section.

FIG. 8 shows the stator assembly 32 in perspective along the direction indicated VIII in FIG. 5.

The different surfaces A1, A2, At, and $\Sigma$ as well as the radial height H33, H35 of the blades 33, 35 are indicated therein. The inner support 36 as well as the outer support 38 are partially represented.

Figure 9:
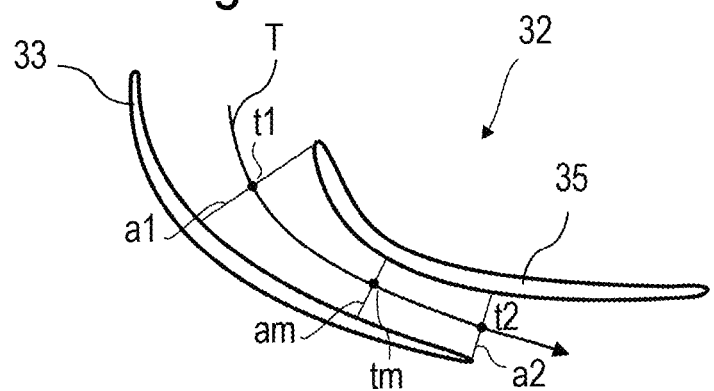
FIG. 9 shows a sectional view of another example of a stator assembly.

FIG. 9 shows a design in which the extrados 35.6 approaches the intrados 33.5 and then moves away from it. This results in a decrease in the area $\phi t$ of the channel 40 from the inlet t1 to a point tm where a surface Am has a minimum area @m. The decrease is followed by an increase in the area from point tm to t2.

Figure 10:
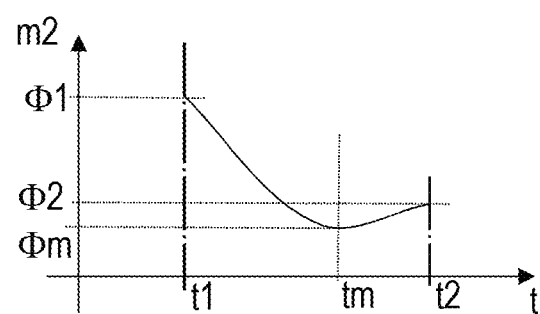
FIG. 10 shows the variations of the corresponding areas.

FIG. 10 illustrates a possible variation of $\phi t$ between t1 and t2. The order of magnitude of the value of $\phi m$ is $2/7^{th}$ of $\phi 1$. We can have a variation upstream of the point tm such that $\phi 1/\phi m \leq 3.5$. The point tm can be located approximately halfway between t1 and t2. A value less than or equal to 2/7 for $\phi m/\phi 1$ ensures that even with a ratio between the inlet area and the outlet area chosen equal to 3, the profile of the variations is of the type of that of FIG. 10, i.e., a decrease then an increase.

Figure 13:
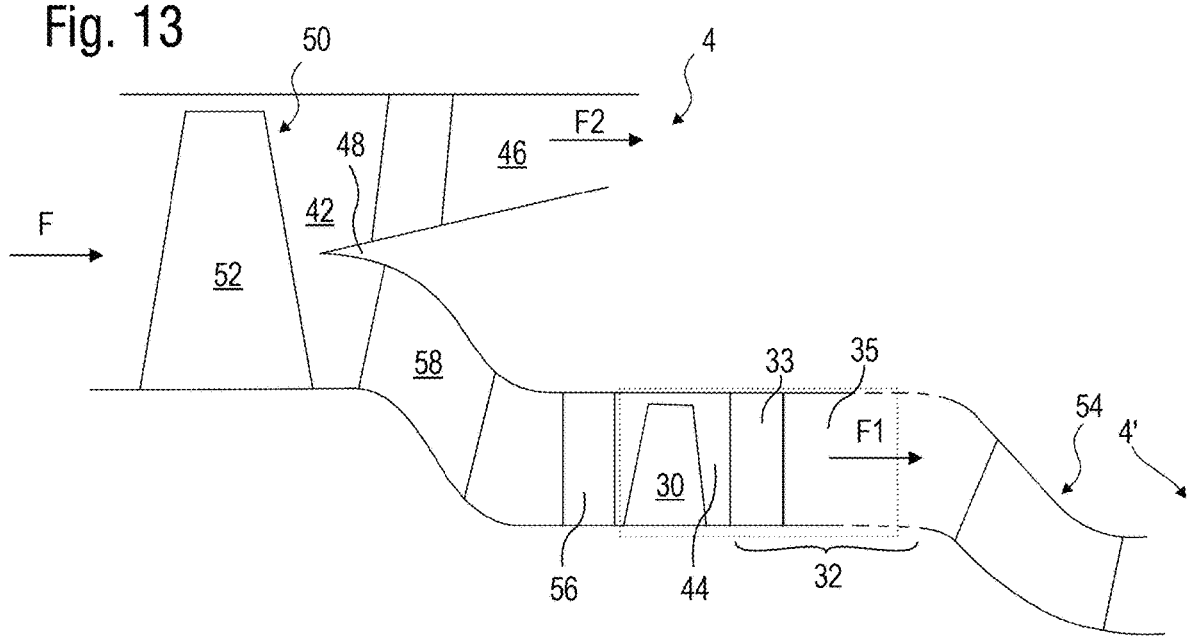

FIGS. 11 to 13 show possible locations of the stator assembly 32 in a turbomachine 1, preferably downstream of a flow separation.

A flow F is split into a primary flow F1 and a secondary flow F2. The flow F flows in an annular vein 42. The primary flows F1 and secondary flows F2 flow respectively in an annular vein 44, 46.

The separation of the flows is carried out by a separation nozzle 48.

Directly (or not) upstream of the edge 48 is located a rotating assembly in the form of a mobile wheel 50 whose blades 52 extend radially in front of the two veins 44, 46.

The stator assembly 32 of the invention is preferably arranged in the inner vein 44, and the stator assembly 32 precedes a swan-neck shape 54 which can be arranged upstream of a high-pressure compressor 4'. Thus, the stator assembly 32 constitutes the last blades of the low-pressure compressor 4 of the turbomachine 1.

The compressor 4 may include variable stator vanes (VSV). The stator assembly 32 may contain the only stator vanes of the compressor that are not variable.

The compressor 4 may comprise between 1 and 4 compression stages, each formed of at least one annular row of rotor blades directly followed by at least one annular row of stator blades.

The inner vein 44 may comprise a rotating assembly comprising the rotor blades 30.

The stator assembly 32 is arranged directly downstream of the rotating blades 30.

FIG. 12 shows an alternative in which the flow F1 entering the vein 44 first encounters fixed blades 56.

FIG. 13 illustrates a variant in which the vein 44 describes a swan neck shape 58 upstream of the rotor assembly 32.

The invention is particularly applicable to the last stage of a low-pressure or high-pressure compressor. The invention is also applicable to so-called unducted turbomachines (CROR "Counter-Rotating Open Rotor" or USF "Unducted Single Fan").

The invention relates, in a non-limiting manner, to transonic compressors, that is to say for which the speed U of the radially external end of the rotor blades 30 is between 360 m/s and 420 m/s (or the relative speed W2 is greater than 340 m/s).

The invention claimed is:

1. A turbomachine comprising an impeller and a separation nozzle, the separation nozzle being arranged downstream of the impeller and separating an air flow into an internal flow traveling through an internal vein and an external flow traveling through an external vein, wherein the turbomachine comprises a stator assembly, the assembly comprising:
   an inner support and an outer support;
   an upstream blade extending substantially radially from the inner support to the outer support, and comprising a trailing edge and an intrados; and
   a downstream blade extending substantially radially from the inner support to the outer support, and comprising a leading edge and an extrados;
   wherein the upstream blade and the downstream blade overlap axially over at least part of their radial height, from the inner support to the outer support, a channel thus being defined between the upstream blade and the downstream blade, the channel being circumferentially delimited by the intrados of the upstream blade and the extrados of the downstream blade, and delimited radially by the inner support and the outer support;
   the channel defining: a plurality of curves equidistant from the intrados and the extrados in respective planes parallel to an axial direction and located at a given radial coordinate;
   a plurality of input segments perpendicular to each curve and passing through a point of the leading edge contained in the respective plane;
   a plurality of output segments perpendicular to each curve and passing through a point of the trailing edge contained in the respective plane;
   an inlet surface, locus of the input segments on all the radial coordinates of the blades;
   an outlet surface, locus of the output segments on all the radial coordinates of the blades;
   an area of the input surface being between two and four times an area of the output surface,
   the turbomachine further comprising a high-pressure compressor arranged downstream of the stator assembly, the stator assembly being separated from the high-pressure compressor by a swan-neck shape.

2. The turbomachine according to claim 1, wherein the area of the inlet surface is between 1.2 and 3 times the area of the outlet surface.

3. The turbomachine according to claim 1, wherein in each of the planes, the intrados and the extrados define profiles whose tangents, for a given axial coordinate, respectively define an upstream deflection angle and a downstream deflection angle relative to the axial direction, the downstream deflection angle being greater than or equal to the upstream deflection angle for any given axial coordinate of the overlap, and for any given radial height of the blades.

4. The turbomachine according to claim 3, wherein for any given axial coordinate and for any given radial height, the downstream deflection angle is greater than the upstream deflection angle by at least at least 5°.

5. The turbomachine according to claim 3, wherein a difference between the downstream deflection angle and the upstream deflection angle decreases as a function of the axial coordinate.

6. The turbomachine according to claim 1, wherein the channel contains a multitude of intermediate surfaces, at respective curvilinear positions between the inlet surface and the outlet surface, and the area of the intermediate surfaces decreases monotonically between the inlet surface and the outlet surface.

7. The turbomachine according to claim 1, wherein the channel includes a multitude of intermediate surfaces at respective curvilinear positions between the inlet surface and the outlet surface, and the area of the intermediate surfaces decreases from the value of the inlet area to a minimum value then increases to the value of the outlet area.

8. The turbomachine according to claim 7, wherein the minimum value is equal to or less than two sevenths of the value of the inlet area.

9. The turbomachine according to claim 7, wherein the minimum value is obtained in the vicinity of a median curvilinear position of the channel.

10. The turbomachine according to claim 1, wherein the channel has an axial length between 0.1 and 0.3 times a sum of the axial length of the upstream blade and the axial length of the downstream blade.

11. The turbomachine according to claim 1, wherein for any radial coordinate, the upstream blade defines an upstream blade inlet angle, an upstream blade outlet angle, and an upstream blade deviation defined by a difference between the upstream blade outlet angle and the upstream blade inlet angle, and the downstream blade defines a downstream blade inlet angle, a downstream blade outlet angle, and a downstream blade deviation defined by a difference between the downstream blade outlet angle and the downstream blade inlet angle, a ratio between the upstream blade deviation and a sum of the upstream deviation and downstream deviation being between 0.1 and 0.6.

12. The turbomachine according to claim 11, wherein the ratio between the upstream blade deviation and the sum of the upstream deviation and downstream deviation is 0.4.

13. The turbomachine according to claim 1, wherein a ratio between the axial length of the upstream blade and a sum of the axial length of the upstream blade and the downstream blade is between 1 and 4.

14. The turbomachine according to claim 13, wherein the ratio between the axial length of the upstream blade and the sum of the axial length of the upstream blade and the downstream blade is 1.15.

15. The turbomachine according to claim 1, further comprising an annular row of upstream blades and an annular row of downstream blades, a number of the upstream blades and a number of the downstream blades being identical, the upstream blades and the downstream blades defining a plurality of identical channels between a respective upstream blade and a respective downstream blade, the inner support being an internal shell and the outer support being an external shroud or a casing.

16. The turbomachine according to claim 1, the stator assembly being arranged in the internal vein, the internal vein defining a swan neck shape upstream of the stator assembly.

17. A method of using the turbomachine of claim 1, comprising a step of rotating the impeller at a rotational speed such that a relative linear speed of at least a portion of the impeller exceeds the speed of sound.

18. The turbomachine according to claim 3, wherein for any given axial coordinate and for any given radial height, the downstream deflection angle is greater than the upstream deflection angle by at least at least 10°.

19. The turbomachine according to claim 3, wherein for any given axial coordinate and for any given radial height, the downstream deflection angle is greater than the upstream deflection angle by at least at least 20°.

* * * * *